United States Patent [19]

Fujii et al.

[11] Patent Number: 5,722,031
[45] Date of Patent: Feb. 24, 1998

[54] IMAGE FORMING APPARATUS HAVING STAPLER FOR STAPLING SHEETS

[75] Inventors: Takayuki Fujii, Yokohama; Akiyoshi Kimura, Kawasaki; Yoshiyuki Suzuki, Yokohama; Tadashi Suzuki, Tokyo; Shinichi Nakamura, Kawasaki; Yoshihiko Suzuki, Tokyo; Minoru Nada, Kawasaki; Satoru Kutsuwada, Yokohama; Kenji Kobayashi, Tokyo; Satoshi Kaneko; Shokyo Koh, both of Kawasaki; Norifumi Miyake, Tokyo; Hirohiko Tashiro, Yokohama, all of Japan

[73] Assignee: Canon Kabushiki Kaisha, Tokyo, Japan

[21] Appl. No.: 517,468

[22] Filed: Aug. 21, 1995

[30] Foreign Application Priority Data

Aug. 25, 1994 [JP] Japan ................................. 6-224138
Nov. 1, 1994 [JP] Japan ................................. 6-292363

[51] Int. Cl.⁶ .......................... G03G 15/00; B65H 39/00
[52] U.S. Cl. .......................... 399/410; 399/408; 358/296; 270/58.07; 270/58.08
[58] Field of Search ........................... 355/324, 321–323; 270/37, 53, 58.07, 58.08; 358/296, 300, 302; 399/408, 410

[56] References Cited

U.S. PATENT DOCUMENTS

| | | |
|---|---|---|
| 4,763,167 | 8/1988 | Watanabe et al. .................. 355/324 X |
| 4,905,054 | 2/1990 | Rood ...................................... 355/318 X |
| 5,285,249 | 2/1994 | Mahoney ............................... 355/324 |
| 5,343,304 | 8/1994 | Nakai et al. ........................... 355/324 X |
| 5,461,459 | 10/1995 | Muramatsu et al. ................ 355/324 X |
| 5,481,354 | 1/1996 | Nakajima ............................... 355/324 |
| 5,508,798 | 4/1996 | Yamada ................................. 355/324 |
| 5,638,181 | 6/1997 | Kubo et al. ............................ 358/296 |

FOREIGN PATENT DOCUMENTS 2264560  9/1993  United Kingdom .................. 355/324

Primary Examiner—Matthew S. Smith
Attorney, Agent, or Firm—Fitzpatrick, Cella, Harper & Scinto

[57] ABSTRACT

An image forming apparatus includes an image forming unit for forming images onto sheets in either one of a first mode for sequentially forming the images onto the sheets from a last page and a second mode for sequentially forming the images onto the sheets from a front page. The apparatus also includes a rotation processing unit for rotating the image in the direction of 180° for the direction of the image in the first mode before the image forming unit forms the images in the second mode. The apparatus further includes a tray for stacking the sheets, a reversing path for reversing the sheet in the second mode, a conveying path for conveying the sheets formed with the images by the image forming unit to the tray directly or through the reversing path, and a stapler for performing a stapling on an upstream side in the conveying direction in the sheet and on a left side or a right side in the conveying direction. The stapler performs the stapling on the left side in the conveying direction in the first mode and on the right side in the conveying direction in the second mode.

22 Claims, 17 Drawing Sheets

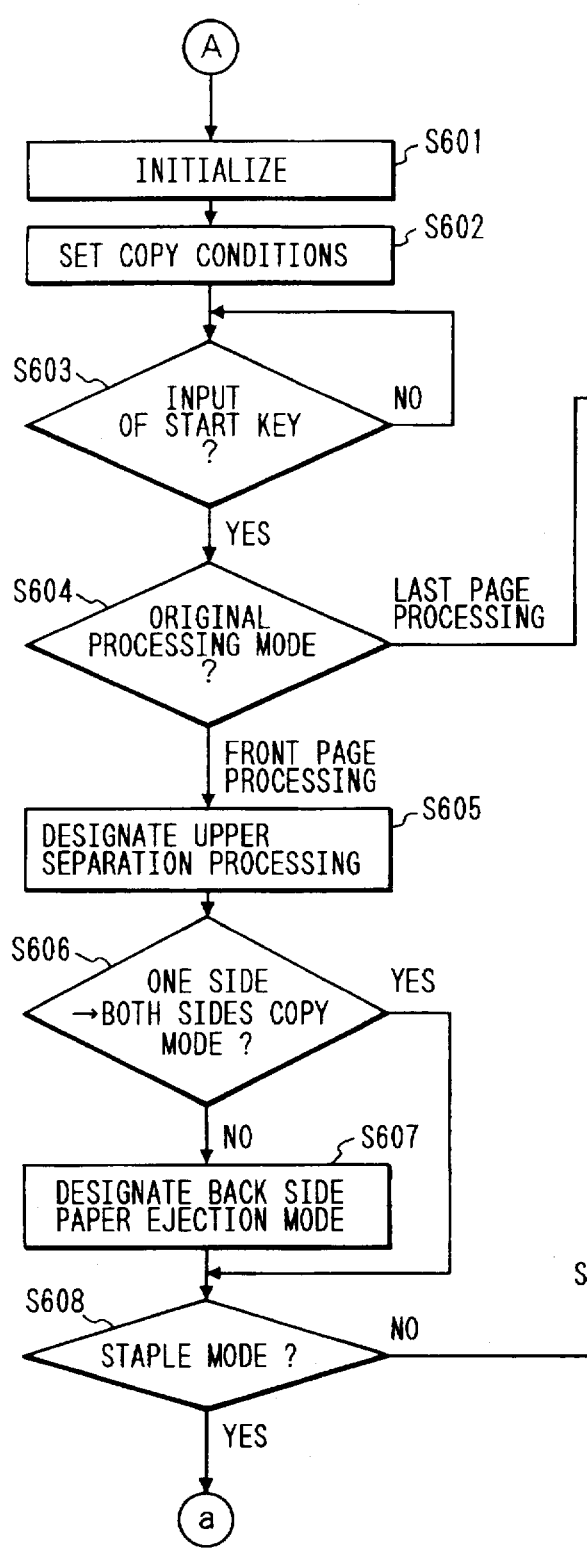
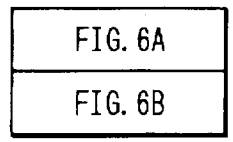
FIG. 6A
FIG. 6

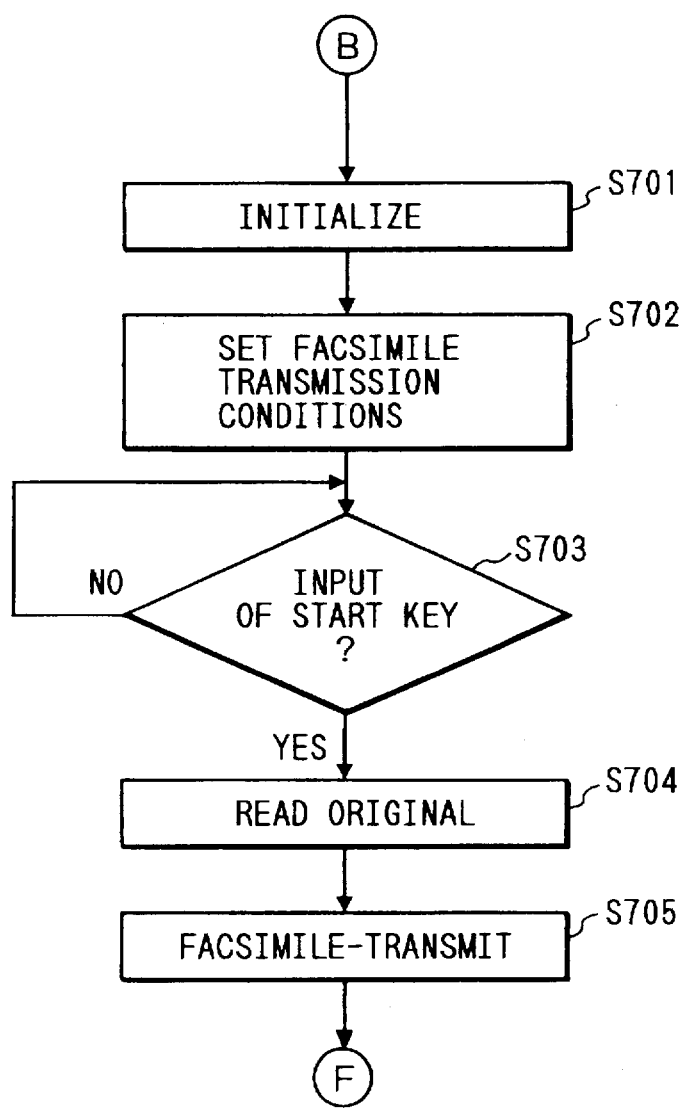

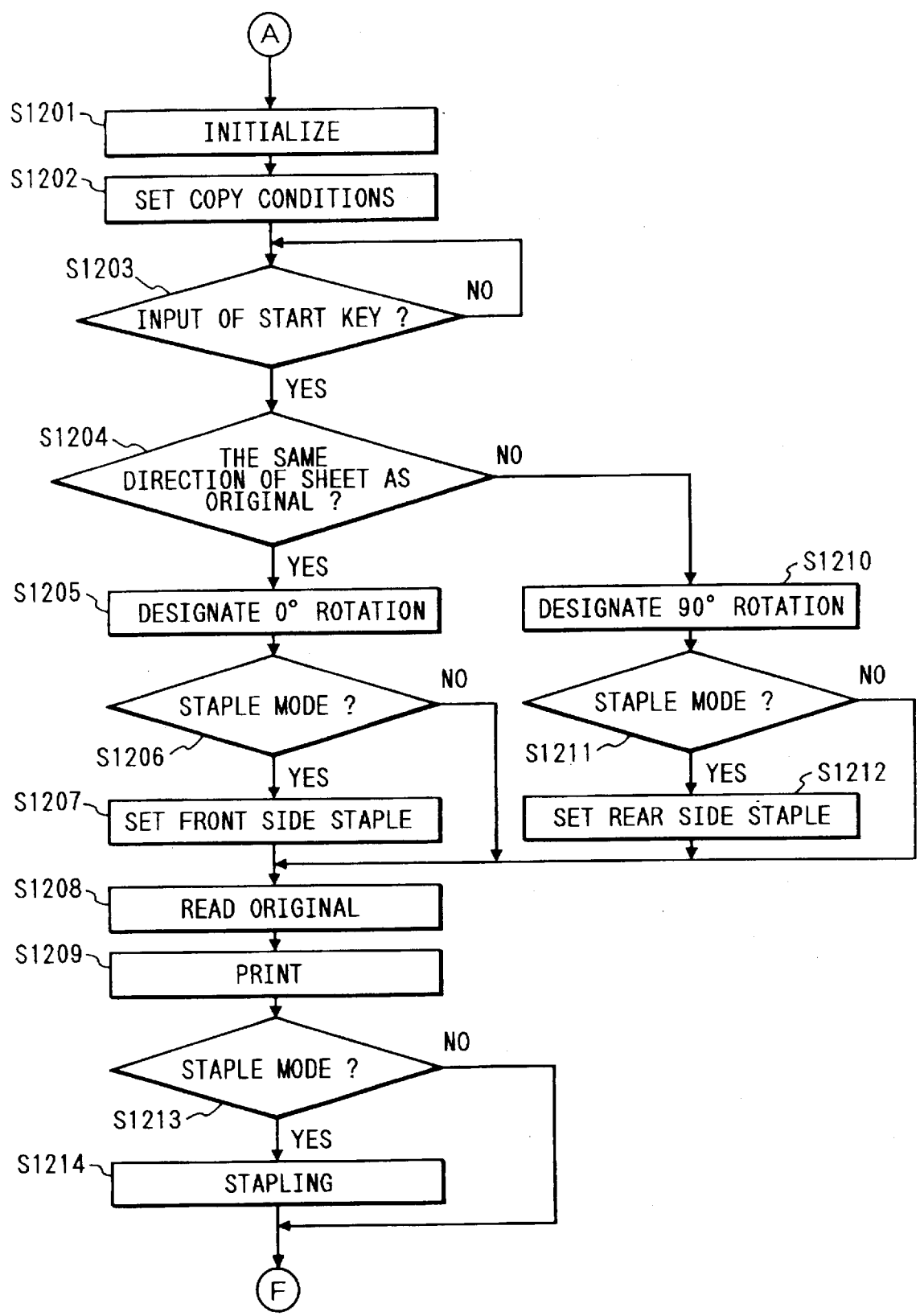

FRONT SIDE PAPER EJECTION & NO IMAGE ROTATION

BACK SIDE PAPER EJECTION & IMAGE ROTATION

IMAGE FORMING APPARATUS HAVING STAPLER FOR STAPLING SHEETS

BACKGROUND OF THE INVENTION

1. Field of the Invention

The present invention relates to an image forming apparatus having a stapler for stapling sheets.

2. Related Background Art

There has been proposed an image forming apparatus having an automatic document feeder such that a plurality of originals put on an original supporting plate are sequentially separated from the top or bottom of the originals and are automatically fed to an image reading position. A stapling apparatus for performing a stapling process can be connected to the image forming apparatus.

However, in the case where a plurality of originals put on the original supporting plate are sequentially separated from the top of the originals and are automatically fed to the image reading position, the originals are processed from the top of the original bundle, namely, the front page of the originals. Therefore, if a stapling process is executed in a manner similar to the case where the originals are processed from the last page mentioned above, there is a problem such that the order of pages is reversed as shown in FIG. 18A or, even if copy sheets are reversed and are ejected out, although the copy sheets are outputted in accordance with the correct order of pages, a staple processing position is located at a right upper position as shown in FIG. 18B.

On the other hand, since the stapling apparatus always hits a staple in the downward direction, when a stapling process is performed to the copy sheets which were reversely ejected out, there is a problem such that the feet of the staple are projected out to the front side of the copy sheets as shown in FIG. 18B.

SUMMARY OF THE INVENTION

It is an object of the invention to provide an image forming apparatus which can solve the above problems.

Another object of the invention is to provide an image forming apparatus which can staple at the optimum position of sheets.

Still another object of the invention is to provide an image forming apparatus which can always insert a staple from the front surface of sheets.

The above and other objects and features of the present invention will become apparent from the following detailed description and the appended claims with reference to the accompanying drawings.

BRIEF DESCRIPTION OF THE DRAWINGS

FIG. 7 is a flowchart showing a control procedure of a facsimile transmitting function;

FIG. 12 is a flowchart showing another control procedure of a copying function;

DETAILED DESCRIPTION OF THE PREFERRED EMBODIMENTS

[First embodiment]

Figure 1:
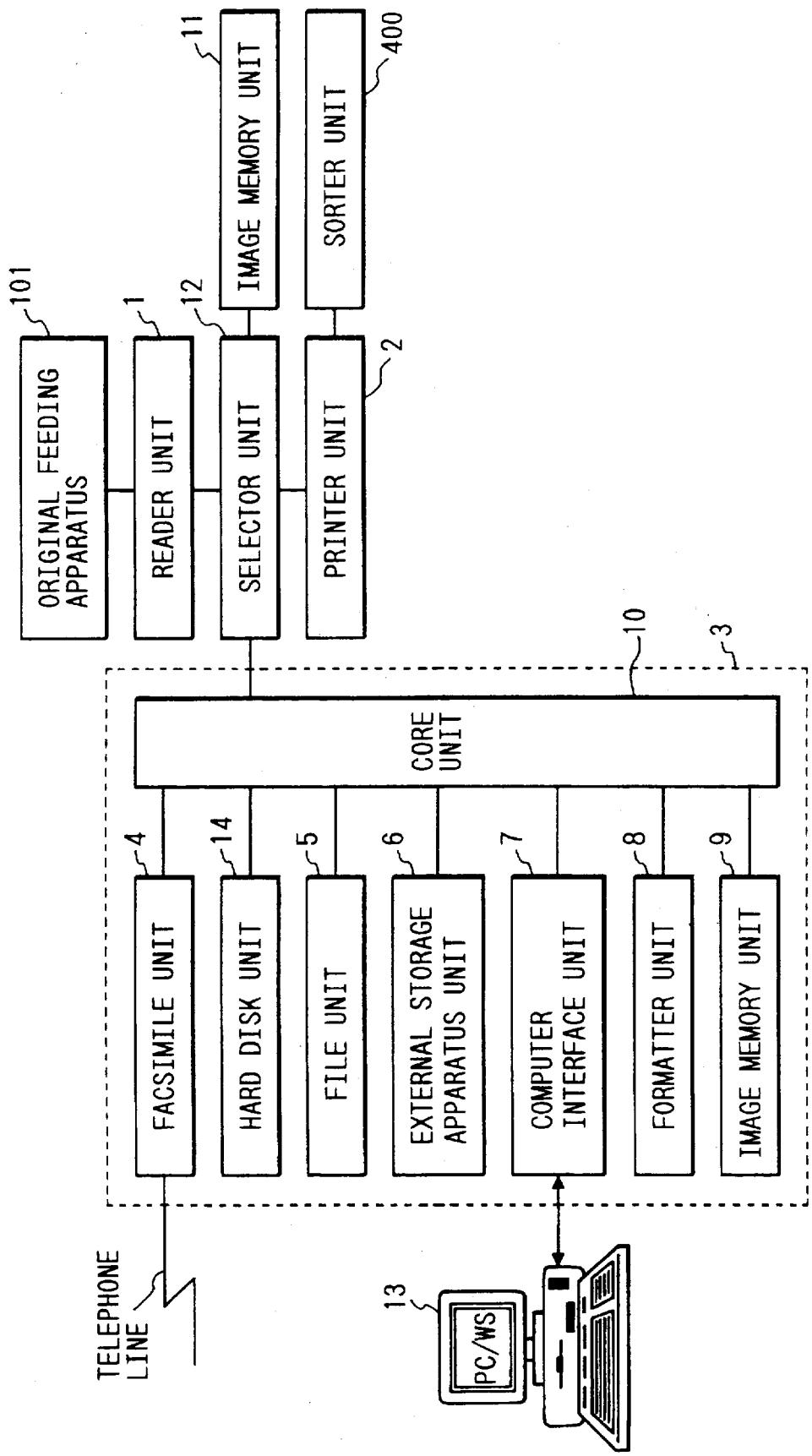
FIG. 1 is a block diagram showing a construction of an image forming apparatus according to the first embodiment of the invention.

The first embodiment of the invention will be first described. FIG. 1 is a block diagram showing a construction of an image forming apparatus according to the first embodiment of the invention. In the diagram, reference numeral 1 denotes an image input apparatus (hereinafter, referred to as a reader unit) for converting an image of an original to image data; 2 an image output apparatus (hereinafter, referred to as a printer unit) serving as image forming means which has a plurality of kinds of recording paper cassettes and outputs the image data as a visible image onto a recording paper by a print command; and 3 an external apparatus which is electrically connected to the reader unit 1 and has various kinds of functions. The external apparatus 3 has: a facsimile unit 4 for performing facsimile transmission and reception; a file unit 5 for converting various original information to electric signals and preserving to a hard disk unit 14 such as a magnetooptic disk or the like; a hard disk 6 connected to the file unit 5; a computer interface unit 7 for interfacing with an LAN (local area network) and a PC/WS (personal computer or workstation) 13, which will be explained hereinafter; a formatter unit 8 for developing code information from the PC/WS 13 to image information; an image memory unit 9 for storing the information from the reader unit 1 or for temporarily storing information transmitted from a computer; a core unit 10 for controlling each of the above units; and the like. Reference numeral 11 denotes an image memory unit for storing the image data from the reader unit 1 or rotating the image; 12 a selector for selectively switching an input from the reader unit 1, an input and an output with the core unit 10, and an input and an output with the image memory unit 11, thereby changing an image bus; and 13 the host computer such as personal computer (PC), workstation (WS), or the like connected to the computer interface unit 7.

Figure 2:
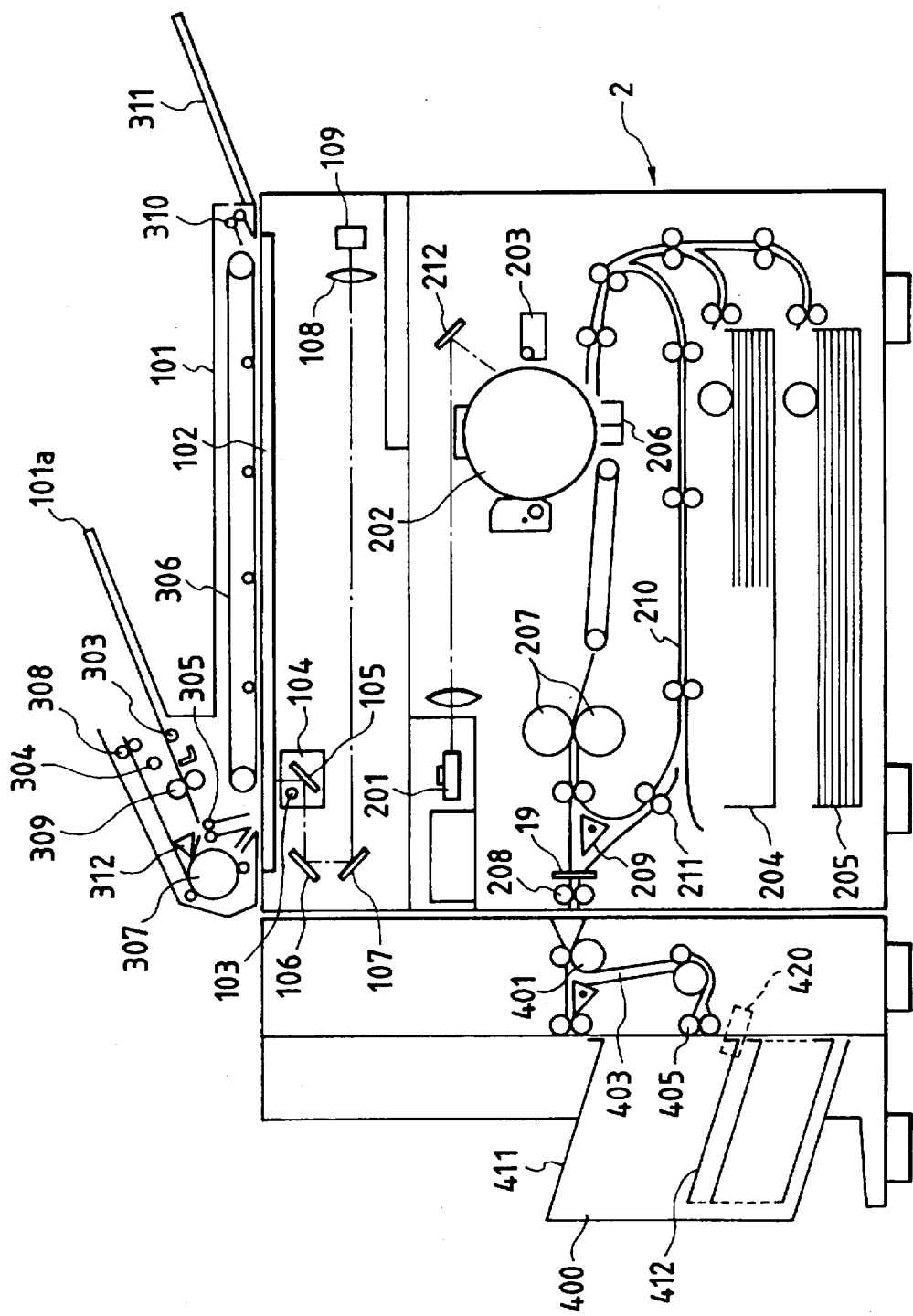
FIG. 2 is a vertical sectional side elevational view showing a construction of a reader unit and a printer unit.

FIG. 2 is a vertical sectional side elevational view showing a construction of the reader unit 1 and printer unit 2 in the image forming apparatus shown in FIG. 1. In the diagram, a plurality of originals (original bundle) (not shown) are stacked (face-up stacking) on an original feeding apparatus 101 in a state in which the front surface faces upward. The originals are sequentially conveyed one by one onto the upper surface of an original supporting plate (platen glass) 102 made of glass. A width direction restriction plate for restricting the width direction of the original in the feeding direction of the original so that the original is not obliquely moved when the original is fed is provided for an original stacking tray 101a. The width direction restricting plate is slided and moved in the direction perpendicular to the feeding direction of the original.

The operation in case of separating the original bundle on the original stacking tray 101a downward will be first described. In FIG. 2, the originals are separated downward one by one from the bottom portion of the original bundle by a semicircular roller 303 and a separating roller 309. The separated original is conveyed to an exposing position of the original supporting plate 102 by a conveying roller 305 and a conveying belt 306 and is stopped there. After that, the image reading operation is started. After the image was read, the original on the platen glass 102 is returned to the top surface of the original bundle put on the original stacking tray 101a by a large conveying roller 307 and a paper ejecting roller 308.

The operation in case of separating the original bundle upward on the original stacking tray 101a will now be described. In FIG. 2, the originals are separated upward one by one from the top of the original bundle by a pickup roller 304 and the separating roller 309. The separated original is conveyed to the exposing position of the platen glass 102 by the conveying roller 305 and conveying belt 306 and is stopped there. After that, the image reading operation is started. After the image is read, the original on the platen glass 102 is ejected onto a paper ejection tray 311 by a paper ejecting roller 310.

In case of a two-sided original, the original is first led to the image reading position as mentioned above and the image is read. After that, by switching a rotatable flapper 312, the front edge of the original is fed to a path and the original is conveyed to the exposing position of the platen glass 102 by the conveying roller 305 and conveying belt 306, and is stopped there. Namely, a reversing operation of the original is executed by the rotation of the large conveying roller 307.

When the original is conveyed to a predetermined position of the upper surface of the platen glass 102, an original illuminating lamp 103 of the scanner unit is turned on. A scanner unit 104 is moved and illuminates the original. A reflection light from the original passes through mirrors 105, 106, and 107, and a lens 108, and is input to an image sensor unit (hereinafter, referred to as a CCD) 109 having a photoelectric converting device such as a CCD or the like.

An image processing unit executes image processes set by inputs of various keys of the console panel, which will be explained hereinafter. The electric signal connected to the printer unit 2 by the selector unit 12 in FIG. 1 is converted to a modulated photosignal by an exposure control unit 201 in FIG. 2. The photosignal is reflected by a mirror 212 and illuminates a photosensitive material (photosensitive drum) 202. A latent image formed on the photosensitive drum 202 by the illumination light is developed by a developing unit 203. A recording paper is picked up and conveyed from an upper stage recording paper stacking unit 204 or a lower stage recording paper stacking unit 205 at a timing matched with a front edge of the latent image. The developed image is transferred onto the recording paper by a transfer unit 206.

The transferred image is fixed to the recording paper by a fixing unit 207. After that, the paper is ejected from the apparatus using a paper ejecting unit 208. The ejected recording paper enters a sorter unit 400. The sorter unit 400 has a plurality of (for example, 20) bins 412 and a tray 411, and thereby is used to perform a sorting operation.

In the sorting mode, the transferred recording papers are sequentially ejected from the paper ejecting unit 208 and enter a conveying roller 401 of the sorter unit 400. Each time the recording paper passes through a conveying path 403 and is ejected to each bin 412 from an electing roller 405, each bin 412 is vertically moved by a bin shift motor (not shown), thereby sorting. When the staple mode is selected and a staple signal is inputted from the printer unit 2, a stapling apparatus (stapler) 420 can staple the recording papers on each bin while moving the bins 412 one by one by the bin shift motor. The stapling apparatus 420 can be horizontally moved in the direction on the front side/rear side by a stapler moving motor (not shown) and can staple at an arbitrary position of the recording papers. The stapler 420 is constructed so as to hit a staple downward.

Subsequently, a method of outputting images to be sequentially read onto both sides of one recording paper will now be described. In FIG. 2, the recording paper fixed by the fixing unit 207 is once conveyed to the paper ejecting unit 208. After that, the conveying direction of the recording paper is reversed and the paper is conveyed to a recording paper stacking unit 210 for re-feeding the paper through a conveying direction switching member 209. When the next original is prepared, an original image is read in a manner similar to that of the foregoing process. However, since the recording paper is fed out from the recording paper stacking unit 210 for re-feeding the paper, two original images can be eventually outputted to both of the front side and the back side of the same recording paper.

A method of reversing the conveying direction of the recording paper and ejecting the paper in a state in which the back side faces upward will now be described. In FIG. 2, the conveying direction of the recording paper fixed by the fixing unit 207 is reversed by once swinging the conveying direction switching member 209 and the paper is conveyed to a reversing roller 211. After the transfer paper passed through the conveying direction switching member 209, the reversing roller 211 is rotated in the opposite direction, thereby conveying the paper to the paper ejecting unit 208. The originals are put on the original feeding apparatus in a face-up state. The originals fed out from the original feeding apparatus by an upward separating method are formed with images so as not to lose the order of the originals. After that, the papers are ejected by the reversal paper ejecting method mentioned above.

Figure 3:
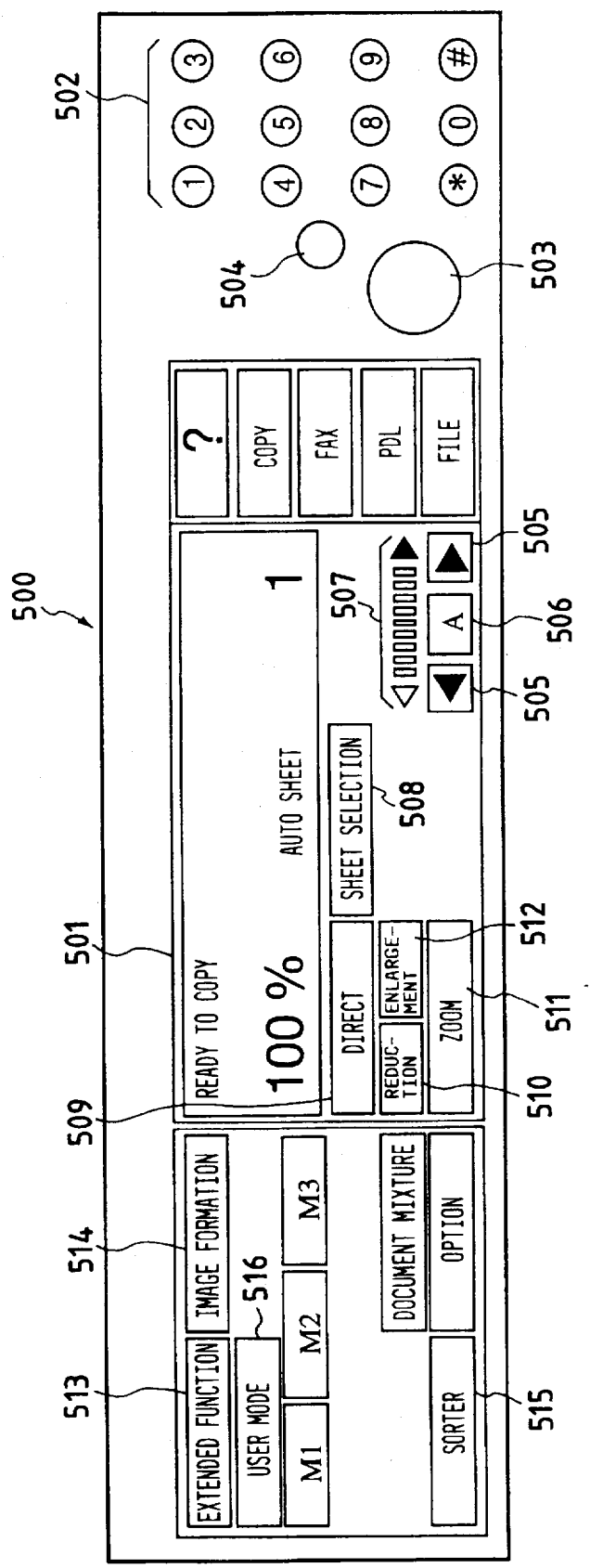
FIG. 3 is a diagram showing a construction of a console panel.

FIG. 3 is a plan view showing an example of the console panel arranged in the reader unit 1 in the image forming apparatus of FIG. 1. As shown in the diagram, various kinds of keys, which will be explained hereinafter, and a display unit 501 comprising a liquid crystal display or the like constructed in a dot matrix shape are arranged on an operation surface of a console panel 500. The display unit 501 displays a state of the apparatus, the number of copies, a magnification, a selected paper, various operation picture planes, and the like. A touch panel switch (not shown) is attached to the surface of the display unit 501. The user can operate switches displayed in the display unit 501 by pressing the touch panel switch.

A start key 503 is a key to start a copy operation, a facsimile operation, and a reading operation. A return key 504 is a key to return a set mode to a standard mode. A group of keys 502 are a ten-key of 0 to 9 and the like for inputting the number of copies, a zoom magnification, a telephone number, or the like.

Keys displayed in the display unit 501 will now be described. A density key 505 is a key to adjust (up/down) a density. A density which is adjusted by the density key 505 is displayed by a density display unit 507. A key 506 has keys to turn on/off an automatic density adjusting function and a display material to display an ON state is provided in each key. A key 508 is a key to select a paper feeding stage and an automatic paper selecting function. Keys 509, 510, and 512 are keys for setting an equal magnification (direct mode), a fixed size reduction, and a fixed size enlargement, respectively. A key 511 is a zoom key to designate a magnification every 1%. A key 513 is a key to designate an extended function. The extended function includes: a serial copy mode function to set a mode for dividing a double-spread original every page and continuously outputting the divided pages or for continuously outputting a two-sided original to other papers every side; a both-sides mode function to set a mode for outputting one-sided originals to both sides, for dividing a double-spread original and outputting to both sides, or for outputting a two-sided original to both sides; and the like.

A key 514 is a key to set an image processing mode. The image processing mode includes a trimming/masking mode for trimming or masking a part of an image, a mode for performing a process to add a shadow, a mesh, an outline, or the like to an image, and the like. A key 515 is a key to set a sorter. A sorting mode, a grouping mode, a staple sorting mode, or the like can be designated by the key 515. A key 516 is a user mode key to designate a mode peculiar to the user. The user mode includes a mode to designate an auto counting operation or designate the number of originals when obtaining a two-sided original from a one-side original, a mode to set an original processing mode for setting whether originals of an original bundle put on the platen glass 102 are processed from the front page or from the last page or whether the originals are automatically switched, and the like.

Figure 4A:
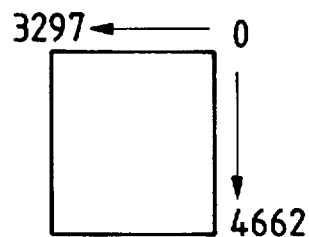
FIGS. 4A to 4E are diagrams for explaining the writing and reading operations of an image memory unit.

A storing method and a reading method of the image data into/from the image memory unit 11 in FIG. 1 will now be described with reference to FIGS. 4A to 4E. As shown in FIG. 4A, the image memory unit 11 is a memory corresponding to the A4 size and has a memory capacity of (4662×3297) pixels.

First, a method of storing the original image into the image memory unit 11 will now be described with reference to FIGS. 4B and 4C.

Figure 4B:
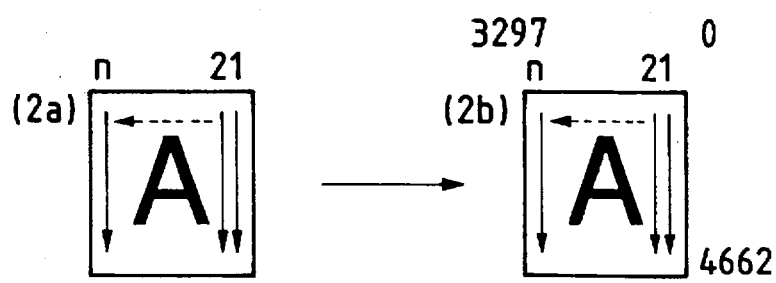

FIG. 4B shows an example in the case where the originals of the A4 size put on the platen glass 102 in FIG. 2 in the longitudinal direction are stored into the image memory unit 11. Reference numeral (2a) denotes a reading order of the originals and (2b) indicates a writing order to write the original images into the image memory unit 11. In FIG. 4B, the originals put in the longitudinal direction as shown at (2a) are sequentially read in the direction shown by arrows in the diagram. First, when the image of the first line is read, it is written from a location of an address of (0, 0) in the direction of an address of (4662, 0) as shown at (2b). When the image of the second line is read, it is written from a location of an address of (0, 1) in the direction of an address of (4662, 1). In this manner, the reading and writing operations are sequentially repeated and the original images are written until an address of (4662, 3297).

Figure 4C:

FIG. 4C shows an example in the case where originals of the A4 size put on the platen glass 102 in the lateral direction are stored into the image memory unit 11. Reference numeral (3a) denotes a reading order of the originals and (3b) indicates a writing order to write the original images into the image memory unit 11. In FIG. 4C, the originals put in the lateral direction as shown at (3a) are sequentially read in the directions shown by arrows in the diagram. First, when the image of the first line is read, as shown at (3b), it is written from a location of an address of (0, 3297) in the direction of an address of (0, 0). When the image of the second line is read, it is written from a location of an address of (1, 3297) in the direction of an address of (1, 0). In this manner, the reading and writing operations are sequentially repeated and the original images are written until an address of (4662, 0).

A process for reading out the image data written in the image memory unit 11 by the methods of FIGS. 4B and 4C mentioned above will now be described with reference to FIGS. 4D and 4E.

Reference numeral (4a) denotes a reading order from the image memory unit 11 and (4b) indicates a direction of an image printed on the recording paper.

Figure 4D:
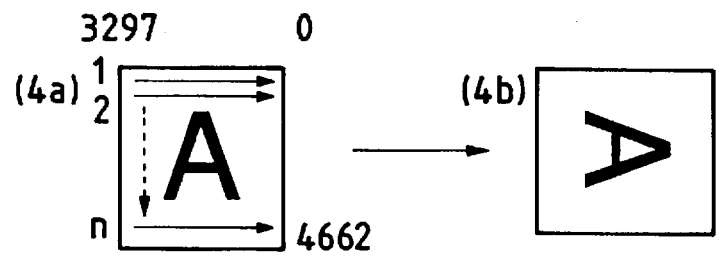

In FIG. 4D, the image data stored as shown at (4a) is read out as follows. Namely, the image data of the first line is read out from a location of an address of (0, 3297) in the direction of an address of (0, 0). Subsequently, the image data of the second line is read out from a location of an address of (1, 3297) in the direction of an address of (1, 0). In this manner, the image data is sequentially read out and is outputted to the printer unit 2, so that the image can be printed in the direction shown at (4b).

Reference numeral (5a) denotes a reading order of the image data from the image memory unit 11 and (5b) indicates a direction of an image printed on the recording paper.

Figure 4E:
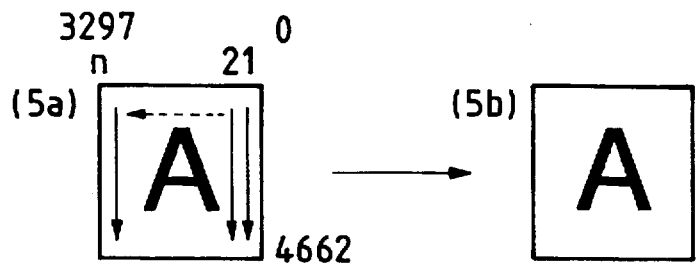

In FIG. 4E, the image data stored as shown at (5a) is read out as follows. Namely, the image data of the first line is first read out from a location of an address of (0, 0) in the direction of an address of (4662, 0). Subsequently, the image data of the second line is read out from a location of an address of (0, 1) in the direction of an address of (4662, 1). In this manner, the image data is sequentially read out and is outputted to the printer unit 2, so that the image can be printed in the direction shown at (5b).

Therefore, when the original of the A4 vertical size shown at (2a) in FIG. 4B is stored by the method of FIG. 4B and is read out by the method of FIG. 4D, the image can be rotated and read out. When the original is read out by the method of FIG. 4E, the image can be read out without rotating. When the original of the A4 lateral size shown at (3a) in FIG. 4C is stored by the method of FIG. 4C and is read out by the method of FIG. 4D, on the other hand, the image can be read out without rotating. When the original is read out by the method of FIG. 4E, the image can be rotated and read out.

The operation of the image forming apparatus of the embodiment will now be described with reference to the flowcharts of FIGS. 5 to 10.

Figure 5:
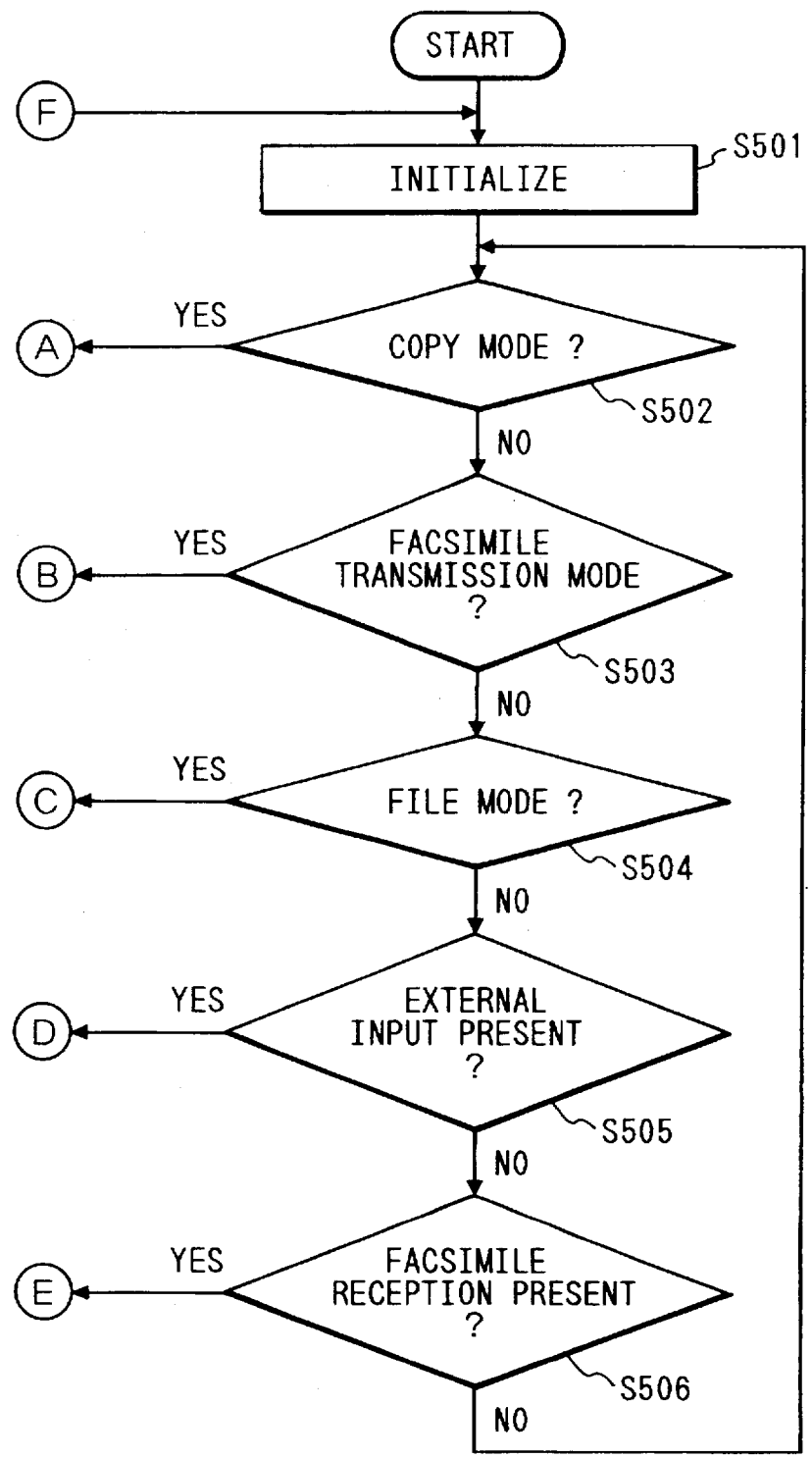
FIG. 5 is a flowchart showing a processing control procedure in the image forming apparatus.

First in step S501 in FIG. 5, an initialization is performed after a power source of the apparatus was turned on. An operation mode selection key is displayed in the display unit 501 of the console panel. When the operator makes a finger come into contact with the console panel on the selection key, the corresponding mode is selected. In step S502, a check is made to see if the selected mode is a copy mode or not. When the copy mode is selected, the processing routine advances to (A) and a processing routine in FIGS. 6A and 6B, which will be explained hereinafter, is executed. When the copy mode is not selected, the processing routine advances to the next step, S503.

In step S503, a check is made to see if the selected mode is a facsimile transmission mode or not. When the facsimile transmission mode is selected, the processing routine advances to (B) and a processing routine of FIG. 7, which will be explained hereinafter, is executed. When the facsimile transmission mode is not selected, the processing routine advances to the next step, S504.

In step S504, a check is made to see if the selected mode is a file mode or not. When the file mode is selected, the processing routine advances to (C) and a processing routine of FIG. 8, which will be explained hereinafter, is executed. When the file mode is not selected, the processing routine advances to next step, S505.

In step S505, a check is made to see if there is an input (external input) from the computer interface unit 7 or not. When there is an input from the computer interface unit 7, the processing routine advances to (D) and a processing routine in FIG. 9, which will be explained hereinafter, is executed. When there is no input from the computer interface unit 7, the processing routine advances to the next step, S506.

In step S506, a check is made to see if there is a reception in the facsimile unit 4 or not. When there is a reception in the facsimile unit 4, the processing routine advances to (E) and a processing routine in FIG. 10, which will be explained hereinafter, is executed. When there is no reception in the facsimile unit 4, the processing routine is returned to step S501 and the above processes are repeated.

Figure 6B:
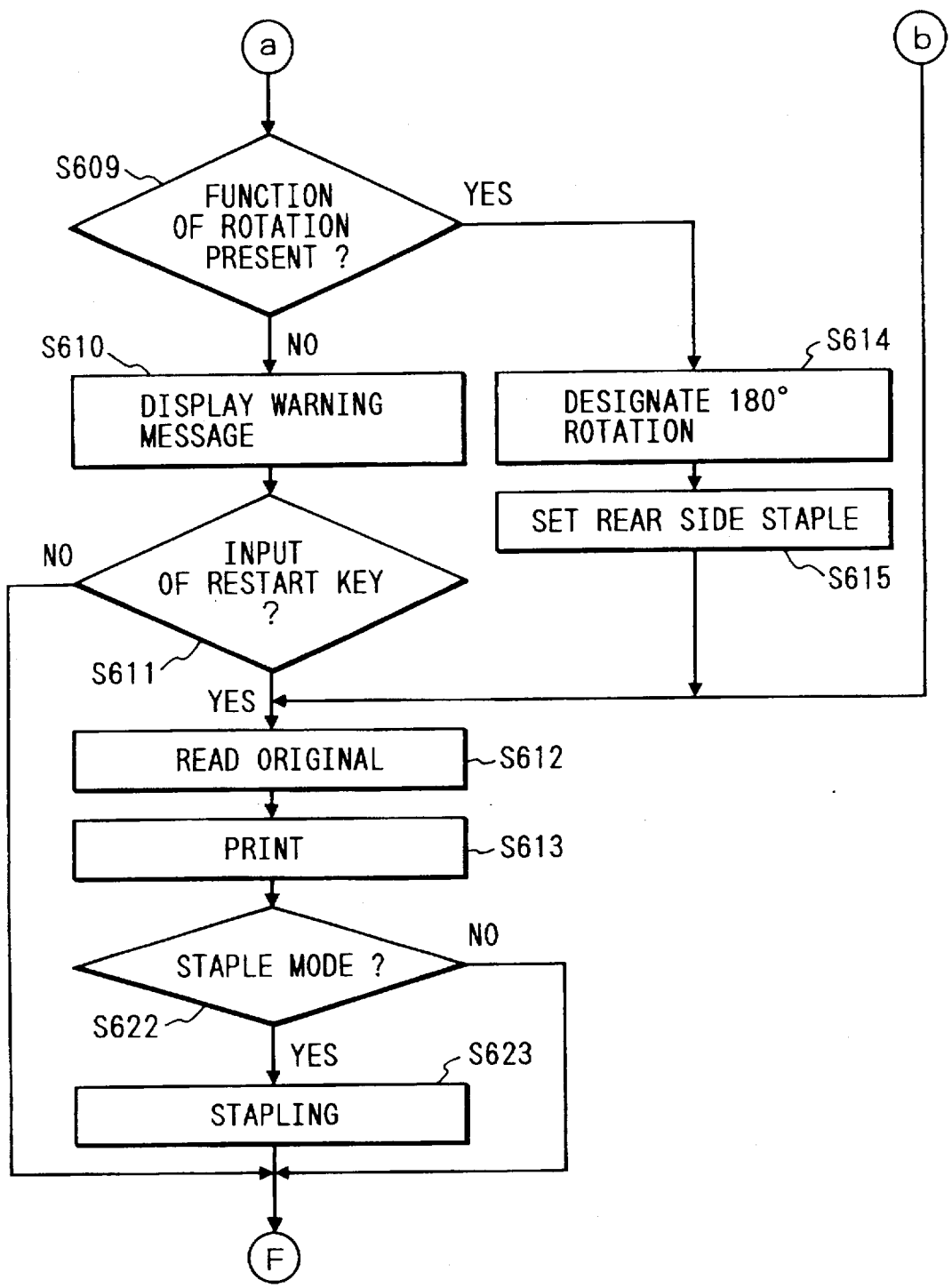
FIG. 6 composed of FIGS. 6A and 6B is a flowchart showing a control procedure of a copying function.

FIG. 6 composed of FIGS. 6A and 6B is a flowchart showing a control procedure in the case where the copy mode is selected. First in step S601, an initialization of the copying operation is executed. In the next step, S602, the data which is inputted from the keys 501 and 502 of the console panel is read and copy conditions are set. Subsequently, in step S603, the apparatus waits for an input of the start key 503. When the start key 503 is depressed, step S604 follows and a check is made to see if the original processing mode relates to a last page processing or a front page processing from the copy conditions set in step S602. When the front page processing has been designated as a result of the judgment, a paper feeding mode of the automatic original feeding apparatus is set to an upper separation processing in step S605. Subsequently, step S606 follows and a check is made to see if the mode is a "one side→both sides copy mode" for obtaining a two-sided paper from the one-side original or other mode from the copy conditions set in step S602. When the mode is not the "one side→both sides copy mode" as a result of the judgment, a back side paper ejection mode is designated in step S607. After that, step S608 follows. When the mode is the "one side→both sides copy mode", the processing routine skips step S607 and advances to step S608.

In step S608, a check is made to see if a staple mode has been set or not. When the staple mode is set as a result of the judgment, a check is made to see if there is a rotating function of the image in step S609 or not. In step S609, a check is made to see if the image memory unit 11 has been installed or not. When the rotating function is not installed, step S610 follows and a warning message indicating that the staple processing cannot be performed at the optimum position is displayed in the display unit 501. After that, the processing routine advances to step S611 and the apparatus waits for a re-input of the start key 503. When the start key 503 is again inputted, the reading operation of the original is started in step S612. Subsequently, in step S613, the image is printed to a predetermined recording paper by the printer unit 2 and the copy image is formed. After that, the processing routine advances to (F) and is returned to the initialization in step S501 in FIG. 5. When it is judged in step S611 that the start key 503 is not again inputted, the processing routine skips steps S612 and S613 and advances to (F) and is returned to the initialization in step S501 in FIG. 5.

When it is judged in step S608 that the staple mode is not set, steps S609 to S611 are skipped and step S612 follows.

When it is judged in step S609 that there is the rotating function, step S614 follows and a process to rotate the image by 180° is set. Subsequently, in step S615, the stapler 420 is moved to the rear side of the sorter unit 400 and at the position matched with the width of recording paper. After that, step S612 follows. In step S612, the original is read and the read original image is rotated by 180° and is printed in step S613.

Figure 11A:
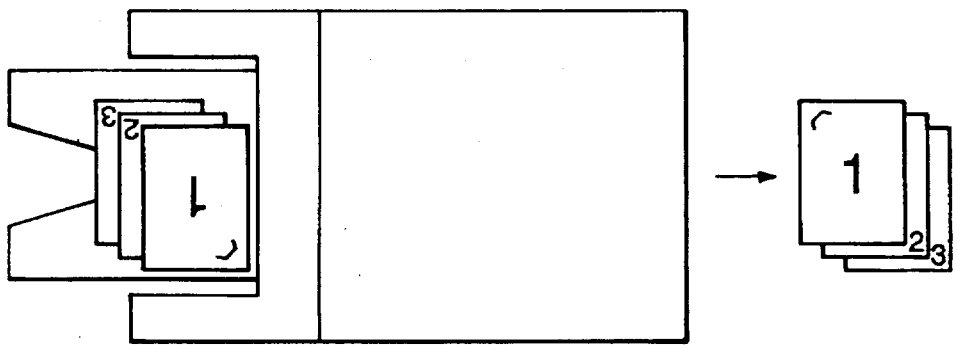
FIGS. 11A and 11B are diagrams for explaining a stapling processing result.
Figure 11B:
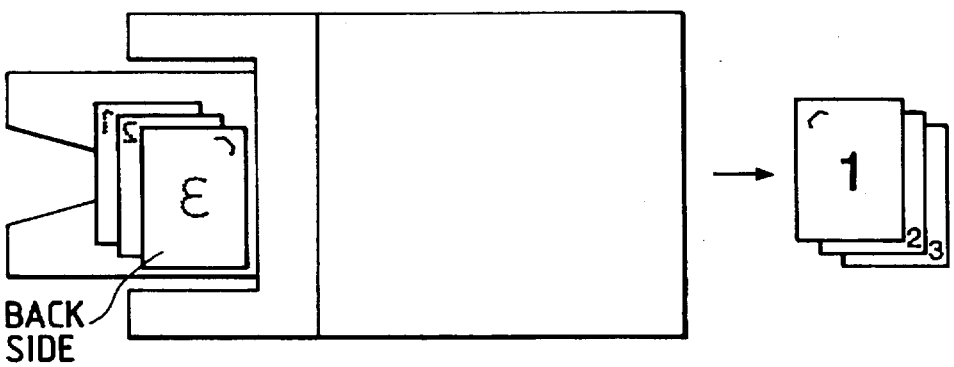

In the staple mode (step S622), after the last recording paper was ejected out, the staple processing is executed (S623) and the processing routine is finished. As shown in FIG. 11B, consequently, the image is rotated by 180°, the paper is reversed and is ejected out, and the stapled position is located at the left upper portion of the recording papers. In FIGS. 11A and 11B, although the recording papers are shown in a state in which they are slightly deviated for convenience of explanation, they are actually overlaid one another without deviating.

In step S604, when it is judged that the last page processing has been designated, the paper feeding mode of the automatic original feeding apparatus is set to a lower separation processing in step S616. After that, step S617 follows. In step S617, from the copy conditions set in step S602, a check is made to see if the mode is the "one side→both sides copy mode" for obtaining the two-sided paper from the one-side original or other mode. As a result of the judgment, when the mode is the "one side→both sides copy mode", a check is made in step S618 to see if the count mode of the original designated is an automatic count mode or not. Thus, when it is judged that the automatic count mode has been designated, in step S619, by circulating the originals put on the automatic original feeding apparatus without copying, the number of originals is counted. After that, step S620 follows. In the case where it is judged in step S617 that the mode is not the "one side→both sides copy mode" and where it is judged in step S618 that the automatic count mode is not designated but the number of originals has been set, the processing routine directly advances to step S620.

In step S620, a check is made to see if the staple mode has been set or not. When the staple mode is set, the stapler 420 is moved to the front side of the sorter unit 400 and at the position matched with the recording paper. After that, step S612 follows. When the staple mode is not set, step S621 is skipped and step S612 follows. In step S612, the original is read. The read original image is printed in step S613.

In the staple mode (S622), after the last recording paper was ejected out, the staple processing is executed (S623) and the processing routine is finished. As shown in FIG. 11A, consequently, the image is printed, the paper is ejected out, and the stapled position is located at the left upper portion of the recording papers.

FIG. 7 is a flowchart showing a control procedure in the case where the facsimile transmission mode is selected. First in step S701, an initialization for facsimile transmission is executed. Subsequently, in step S702, the data inputted by the keys 501 and 502 of the console panel is read and the facsimile transmission conditions are set. After that, the apparatus waits for the input of the start key 503 in step S703. When the start key 503 is depressed, step S704 follows. The original fed from the original feeding apparatus 101 by the upper separation manner is read. The read image data is transmitted to the facsimile unit 4. In step S705, the facsimile unit 4 executes the facsimile transmission in accordance with a set format and a predetermined protocol. After that, the processing routine advances to (F) and the processing routine is returned to the initialization in step S501 in FIG. 5.

Figure 8:
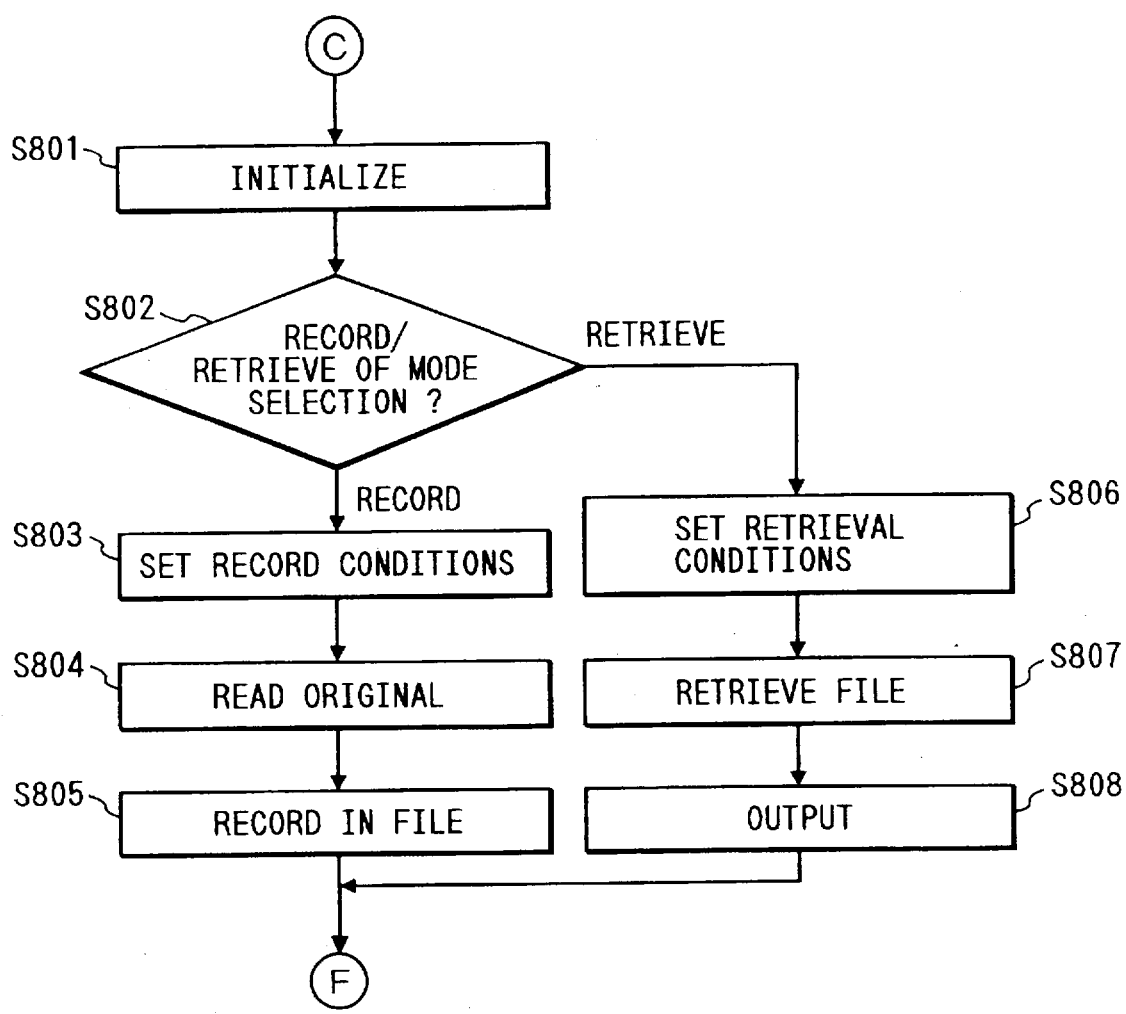
FIG. 8 is a flowchart showing a control procedure of a filing function.

FIG. 8 is a flowchart showing a control procedure in the case where the file mode is selected. First in step S801, an initialization for a filing operation is executed. Subsequently, in step S802, a mode selection to select a file recording mode or a file retrieving mode is displayed in the display unit 501 of the console panel and the apparatus waits for a key input. When a file recording key is depressed, record conditions are set in the next step, S803. Step S804 follows. The original conveyed from the original feeding apparatus 101 by the upper separation manner is read and the read image data is transmitted to the file unit 5. In step S805, the image data is recorded to the external storage apparatus unit 6 of the file unit 5. After that, the processing routine advances to (F) and is returned to the initialization in step S501 in FIG. 5.

When a file retrieval key is depressed in step S802, retrieval conditions are set in step S806. A file is retrieved in step S807. After the result of the retrieval is output in step S808, the processing routine advances to (F) and is returned to the initialization in step S501 in FIG. 5.

Figure 9:
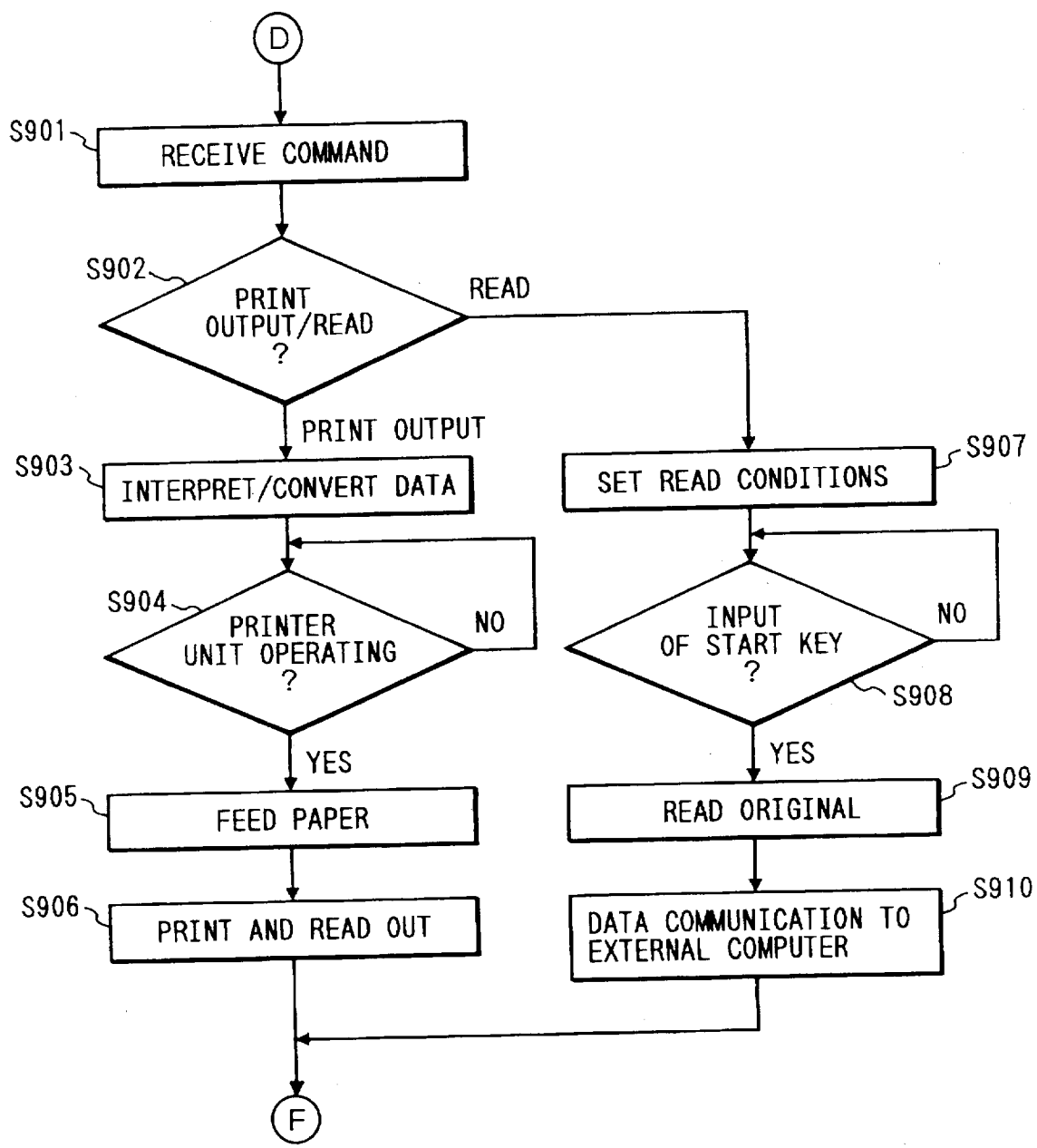
FIG. 9 is a flowchart showing a control procedure of a printer function.

FIG. 9 is a flowchart showing a control procedure in the case where command data is inputted from the outside to the computer interface unit 7. First in step S901, the computer interface unit 7 receives the command data from the outside. The processing routine advances to step S902 and a check is made to see if the command data received in step S901 is an output to be read to the host computer 13 or an output from the host computer 13. As a result of the judgment, when the command data is the output from the host computer 13, the data is transmitted to the formatter unit 8 via the core unit 10 in step S903, the data contents are interpreted, and information is developed in a bit map memory.

In step S904, a check is made to see if the printer unit 2 is operating or not. The apparatus waits for the end of the operation. When the operation of the printer unit 2 is finished, a proper recording paper is selected and the feeding operation of the recording paper is started in step S905. Thus, the recording paper is fed from the recording paper cassettes 204 and 205 and is moved to the transfer unit 206. The processing routine advances to step S906 and the image developed in the bit map memory in step S903 is rotated on the basis of information such as direction, size, and the like of the recording paper and is read out. The read-out image data is transmitted to the exposure control unit 201 and is printed. The operations of the printing portion are common to those described so far. Subsequently, after the data is output, the processing routine advances to (F) and is returned to the initialization in step S501 in FIG. 5.

In the case where the command data received in step S902 is the data to be read to the host computer 13, step S907 follows and the read conditions are set. After that, the apparatus waits for an input of the start key 503 in the next step S908. When the start key 503 is depressed, the original fed from the original feeding apparatus 101 by the upper separation manner is read in step S909. The read image data is transmitted to the host computer 13 in step S910. After that, the processing routine advances to (F) and is returned to the initialization in step S501 in FIG. 5.

Figure 10:
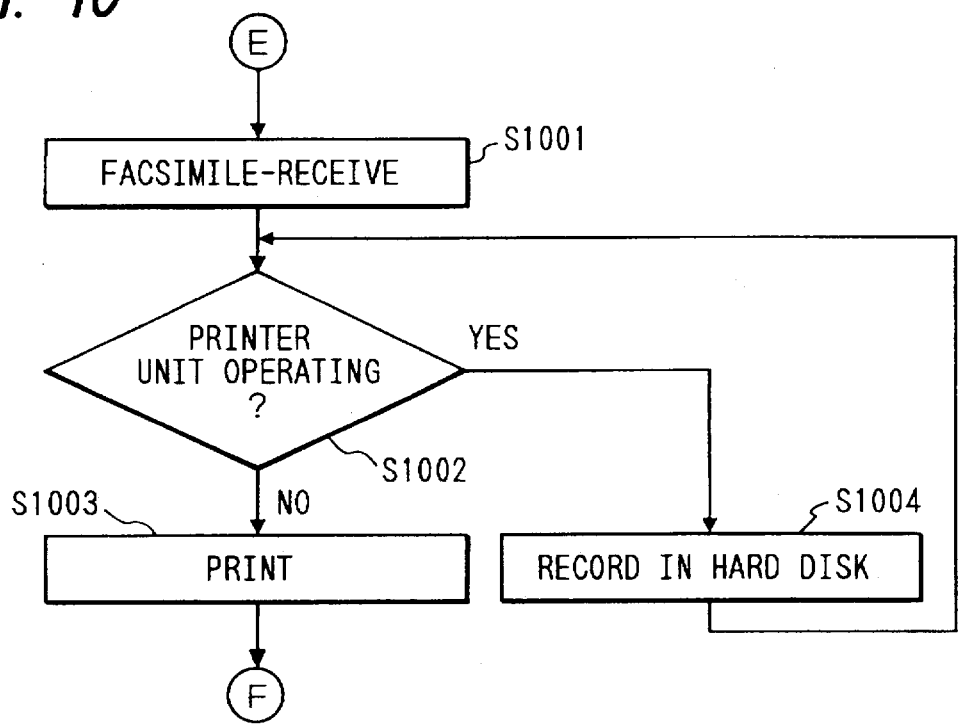
FIG. 10 is a flowchart showing a control procedure of a facsimile receiving function.

FIG. 10 is a flowchart showing a control procedure in the case where there is a facsimile reception. First in step S1001, the facsimile reception is executed by the facsimile unit 4 in step S1001. In step S1002, a check is made to see if the printer unit 2 is operating or not. When it is judged that the printer unit 2 is not operating, the data is transmitted to the printer unit 2 and is printed in next step S1003. After that, the processing routine advances to (F) and is returned to the initialization in step S501 in FIG. 5. When it is judged in step S1002 that the printer unit 2 is operating, step S1004 follows and the data is stored to the hard disk 14 of the facsimile unit 4. After that, the processing routine is returned to step S1002 and the image is printed out when the printer unit 2 is not operating.

When there is a designation of the staple processing in the designation of an output from the facsimile unit 4, in case of outputting from the front page of the originals, by performing processes similar to the processes in step S605 and subsequent steps in FIG. 6A, the staple processing can be performed at a proper position of the recording papers. In case of outputting from the last page of the originals, by executing processes similar to the processes in step S616 and subsequent steps in FIG. 6A, the staple processing can be performed at the proper position of the recording papers.

[Second embodiment]

The second embodiment of the invention will now be described with reference to FIG. 12. In the foregoing first embodiment, the processes according to the processing order of the originals are changed and the back-side paper ejecting process, rotating process of the image, change in staple position, and the like have been executed. In the embodiment, however, the rotating process of the image and the change of the staple position are executed in accordance with a difference between the directions of the original and recording paper. Since a fundamental construction of an image forming apparatus in the embodiment is similar to that of FIGS. 1 to 5 of the first embodiment mentioned above, it will be explained also with reference to those diagrams.

FIG. 12 is a flowchart showing a control procedure in the case where the copy mode is selected in step S502 in FIG. 5. First in step S1201, the initialization of the copying operation is performed. In next step S1202, the data which is inputted from the keys 501 and 502 of the console panel in FIG. 3 is read and the copy conditions are set. After that, the apparatus waits for an input of the start key 503 in FIG. 3 in step S1203. When the start key 503 is depressed, the processing routine advances to step S1204 and a check is made to see if the directions of the original and recording paper are equal or not, based on the original size detected by the sensor of the original feeding apparatus 101 and the recording paper size selected by the copy conditions set in step S1202. When it is judged that the directions of the original and recording paper are equal, step S1205 follows and a mode for setting a rotation mode of the image of the original to 0°, namely, for processing without rotating the image, is set.

In step S1206, a check is made to see if the staple mode has been selected or not from the copy conditions set in step S1202. When it is judged that the staple mode has been selected, step S1207 follows and a mode to execute the staple processing to the front side is set. Step S1208 follows and the reading operation of the original is started. In step S1209, the image is printed onto a predetermined recording paper by the printer unit 2 and the copy image is formed. After that, the processing routine advances to (F) and is returned to the initialization in step S501 in FIG. 5. In the staple mode, after the last recording paper was is ejected, the staple processing operation is executed and the processing routine is finished. In step S1206, when the staple mode is not selected, step S1207 is skipped and step S1208 follows and the reading operation of the original is started. In step S1208, the original is read. In step S1209, the read image is printed.

On the other hand, in step S1204, when the direction of the original and the direction of the recording paper differ, step S1210 follows and a mode for rotating the image by 90° and processing is set. The processing routine advances to step S1211 and a check is made to see if the staple mode has been selected or not from the copy conditions set in step S1202. When it is judged that the staple mode has been selected, step S1212 follows and a mode for performing the staple processing on the rear side is set. After that, step S1208 follows and the reading operation of the original is started. In the staple mode, after the last recording paper is ejected, the staple processing operation is executed and the processing routine is finished. In step S1211, when the staple mode is not selected, step S1212 is skipped and step S1208 follows and the reading operation of the original is started.

As mentioned above, in the case where a plurality of originals put on the platen glass are sequentially separated from the top of the original bundle and are ejected out in a state in which the back side faces upward or in the case where the image is rotated and outputted, by changing the staple processing position or by rotating the image, the staple processing can be performed at the proper position of the outputted recording paper.

[Third embodiment]

Figure 13:
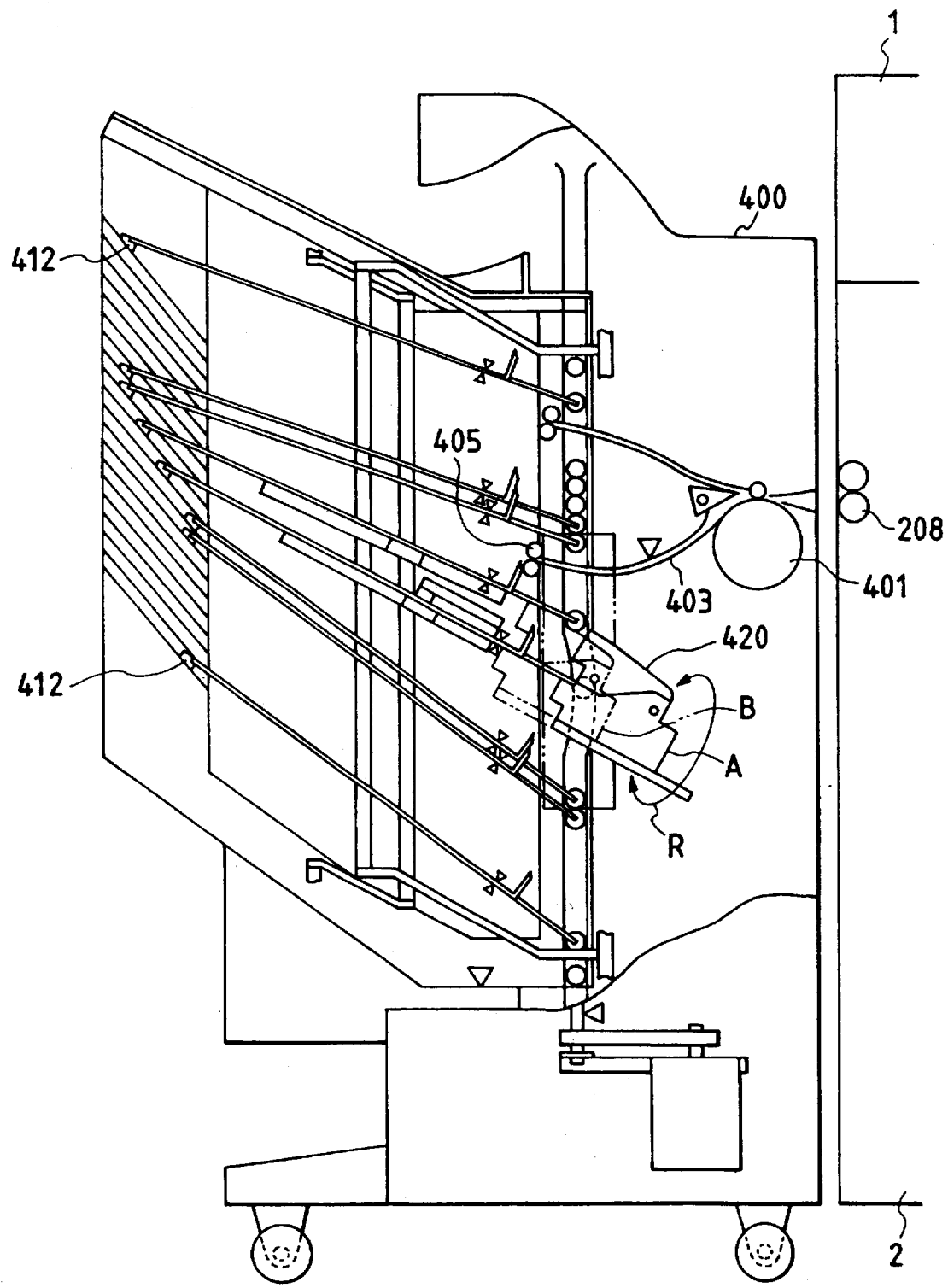
FIG. 13 is a diagram showing a construction of a sorter unit.

The third embodiment will now be described. In the foregoing embodiment, even in any of the front-side paper ejection mode in which the recording paper is ejected in a state in which the front surface faces upward and the back-side paper ejection mode in which the recording paper is ejected in a state in which the back side faces upward, the stapler 420 of the sorter unit 400 always hits the staple downward. In the embodiment, however, the stapler 420 is reversed from the upward state to the downward state, the staple is hit downward in the front-side paper ejection mode, and the staple is hit upward in the back-side paper ejection mode. FIG. 13 shows a construction of the sorter unit 400 of the embodiment. The sorter unit 400 in FIG. 13 differs from the sorter unit 400 in FIG. 2 with respect to a point that the stapler 420 rotates in the direction shown by an arrow (R) and the stapler 420 can be set to either one of a mode to hit the staple downward and a mode to hit the staple upward. In the diagram, (A) denotes a position of the stapler 420 when the bins 412 are vertically moved and (B) indicates a position of the stapler 420 when the stapling operation is executed. The stapler 420 can be moved to the position (A) or (B). The other construction is similar to that of the foregoing embodiment.

Figure 14:
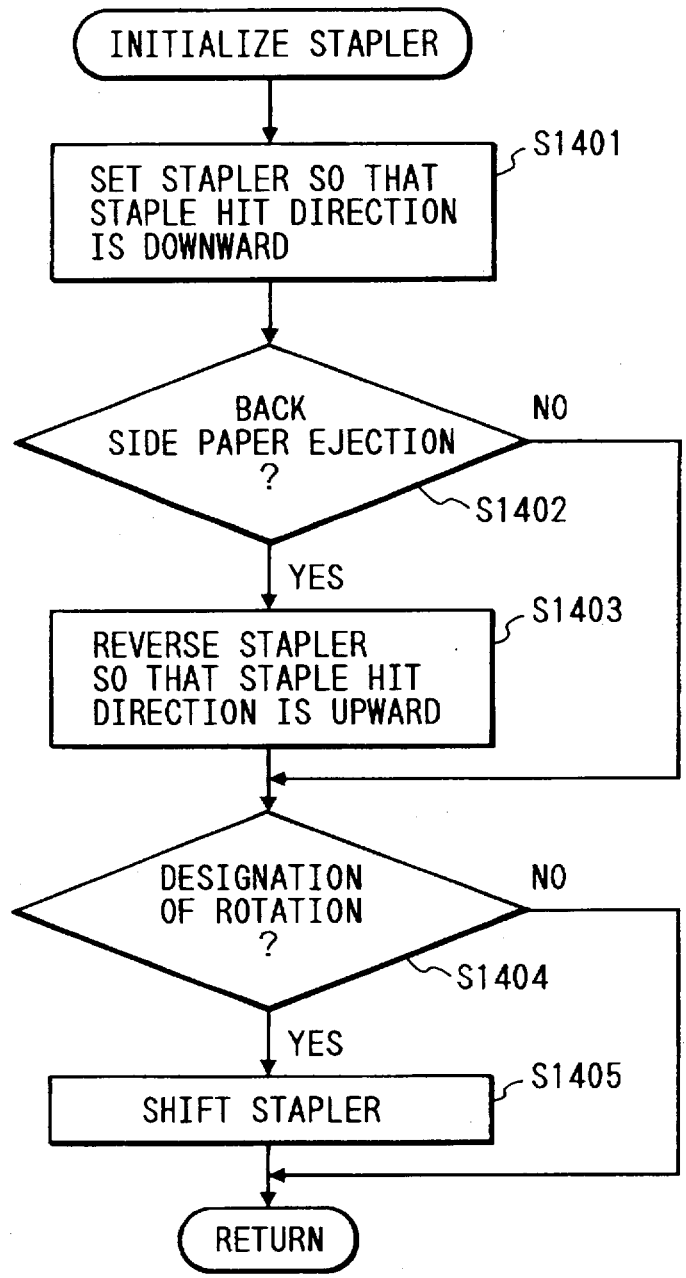
FIG. 14 is a flowchart for initialization of a stapler.

The initialization of the stapler 420 that is executed in steps S621 and S615 in FIGS. 6A and 6B and in steps S1207 and S1212 in FIG. 12 is shown in a flowchart of FIG. 14.

Figure 15:
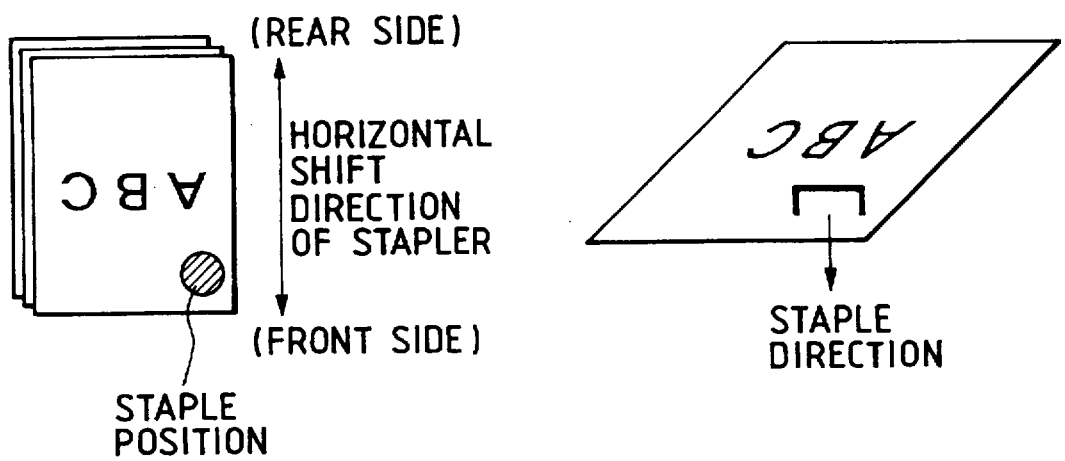
FIG. 15 is a diagram for explaining a stapling direction and a stapling position.
Figure 16:
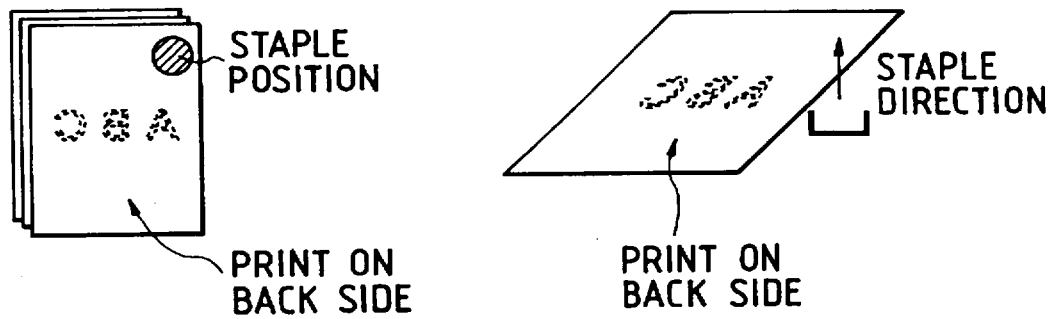
FIG. 16 is a diagram for explaining a stapling direction and a stapling position.

First, the stapler 420 is set so as to hit the staple downward (S1401). In case of the back-side paper ejection mode in which the recording paper is ejected in a state in which the back side faces upward (S1402), the stapler 420 is set so as to hit the staple upward (S1403). The processing routine advances to step S1404. In case of the front-side paper ejection mode (S1402), the processing routine directly advances to step S1404. When a mode to rotate the image is designated (S1404), the stapler 420 is moved to the rear side (S1405). When the mode to rotate the image is not designated (S1404), the stapler 420 is set to a stand-by mode at the position on the front side. By the above control, when the front-side paper ejection mode is set and the image is not rotated, the stapling is executed at the left upper portion of the recording papers in a state shown in FIG. 15. When the back-side paper ejection mode is set and the image is rotated, the stapling is performed at the left upper portion of the recording papers in a state shown in FIG. 16. As mentioned above, the staple is always hit from the front side of the recording paper and a beautiful finishing state is always obtained.

In the flowchart shown in FIGS. 6A and 6B, whether the image is rotated or not and whether the back-side paper ejection mode is set or not are determined in accordance with whether the image is copied from the last page or from the front page in the copy mode. In addition to such a construction, the rotation of the image and the back-side paper ejection mode can be also determined in accordance with the facsimile mode, printer mode, or file mode in which the images are sequentially output in accordance with the order from the front page.

Figure 17:
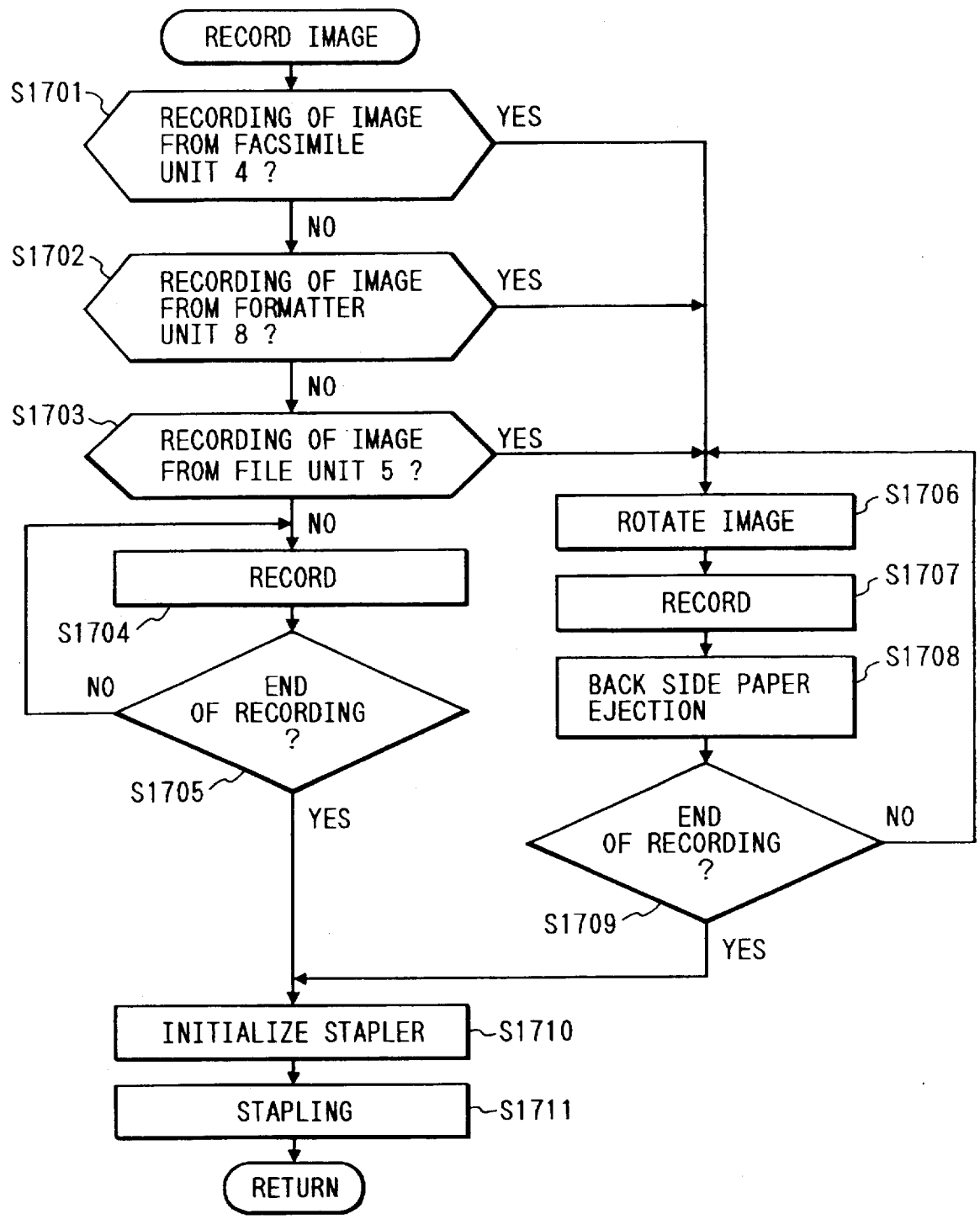
FIG. 17 is a flowchart for an image recording control.
Figure 18A:
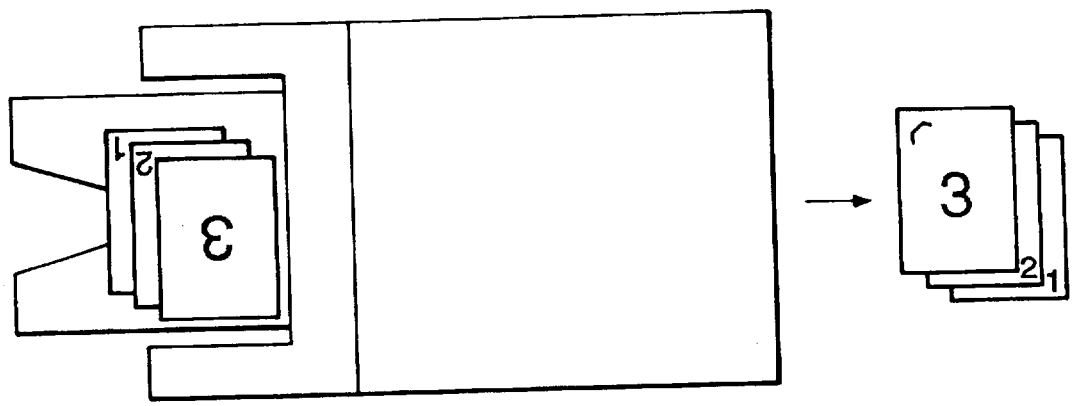
FIGS. 18A and 18B are diagrams for explaining conventional stapling processes.
Figure 18B:
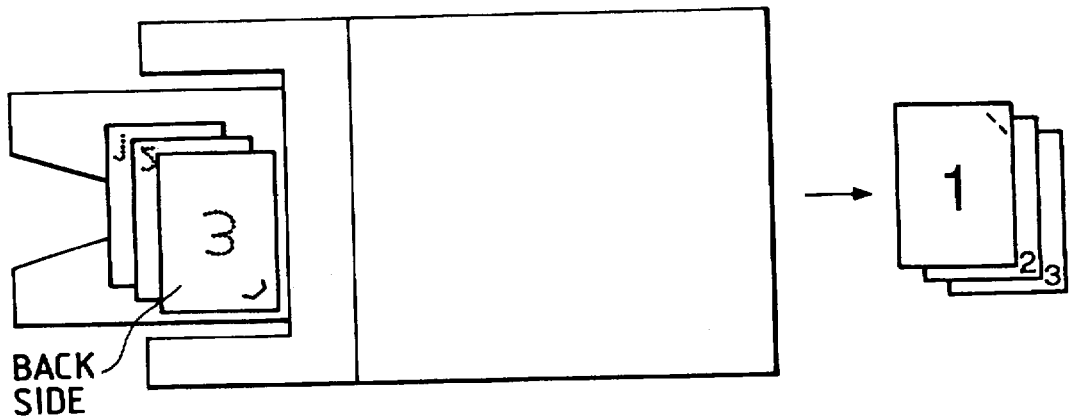

FIG. 17 is a flowchart showing such a control procedure. First in step S1701, a check is made to see if the mode is the recording of an image from the facsimile unit 4 or not. When the mode is not the recording of the image from the facsimile unit 4, step S1702 follows and a check is made to see if the mode is the recording of an image from the formatter unit 8 or not. When the mode is not the recording of the image from the formatter unit 8, step S1703 follows and a check is made to see if the mode is the recording of an image from the file unit 5 or not. When the mode is not the recording of the image from the file unit 5, step S1704 follows and the image record processing is executed. In next step S1705, a check is made to see if the image record processing has been finished or not. When the image record processing is not finished yet, the processing routine is returned to step S1704. When the image record processing is finished, the foregoing stapler initialization is executed (S1710) and the stapling is performed (S1711).

On the other hand, when the mode is the recording of the image from the facsimile unit 4 in step S1701, when the mode is the recording of the image from the formatter unit 8 in step S1702, or when the mode is the recording of the image from the file unit 5 in step S1703, the processing routine advances to step S1706 and the image is rotated. In next step S1707, the image is recorded. In step S1708, the back-side paper ejection is executed. In step S1709, a check is made to see if the image record processing has been finished or not. When the image record processing is not finished, the processing routine is returned to step S1706. When the image record processing is finished, step S1710 follows.

What is claimed is:

1. An image forming apparatus comprising:

image forming means for forming images onto sheets in either one of a first mode for sequentially forming the images onto the sheets from a last page and a second mode for sequentially forming the images onto the sheets from a front page;

ejection means for ejecting the sheet onto which the image is formed by said image forming means in said first mode, in a face up state, and for ejecting the sheet onto which the image is formed by said image forming means in said second mode, in a face down state;

stapler means for stapling the sheets ejected by said ejection means;

reversing means for reversing said stapler means so as to staple in a top-to-bottom manner in said first mode, and to staple in a bottom-to-top manner in said second mode; and rotating means for rotating the image in the direction of 180° for the direction of the image in said first mode before said image forming means forms the image in said second mode.

2. An apparatus according to claim 1, further having:

a tray to stack the sheets; and conveying means for conveying the sheets formed with the images by said image forming means to said tray, and wherein said stapler means staples to the sheets stacked on said tray.

3. An apparatus according to claim 2, wherein said stapler means performs a stapling on an upstream side in the conveying direction in the sheet and on the left side or right side in the conveying direction, and said stapler means performs the stapling on the left side in the conveying direction in said first mode and on the right side in the conveying direction in said second mode.

4. An apparatus according to claim 1, further having:

stacking means for stacking originals;

feeding means for sequentially feeding the originals stacked on said stacking means from a last page to an exposing position in said first mode and for sequentially feeding the originals from a front page to said exposing position in said second mode; and exposing means for exposing the original fed to said exposing position, and wherein said image forming means forms an image of the original exposed by said exposing means onto the sheet.

5. An apparatus according to claim 4, wherein the originals are stacked to said tray in a face-up state, and said feeding means feeds the original at the bottom position on said stacking means in said first mode and feeds the original at the top position on said stacking means in said second mode.

6. An apparatus according to claim 1, further having receiving means for facsimile receiving, and wherein in said second mode, said image forming means forms the image received by said receiving means.

7. An apparatus according to claim 1, further comprising storage means for storing the images, and wherein in said second mode, said image forming means forms the images stored in said storage means.

8. An apparatus according to claim 1, further having input means for inputting an image from a computer, and wherein in said second mode, said image forming means forms the image inputted by said input means.

9. An apparatus according to claim 1, wherein said image forming means ejects the sheets in a face-up state.

10. An apparatus according to claim 1, wherein stapler reversing means reverses said stapler means by rotation.

11. An image forming apparatus comprising:

image forming means for forming images onto sheets in either one of a first mode for sequentially forming the images onto the sheets from a last page and a second mode for sequentially forming the images onto the sheets from a front page;

rotating means for rotating the image in response to said first mode or said second mode;

ejection means for ejecting the sheet onto which the image is formed by said image forming means in said first mode, in a face up state, and for ejecting the sheet onto which the image is formed by said image forming means in said second mode, in a face down state;

stapler means for stapling the sheets ejected by said ejection means;

moving means for moving said stapler means in a vertical direction with respect to an ejecting direction of said ejection means; and control means for moving said stapler means to a first position in said first mode and for moving said stapler means to a second position in said second mode, by said moving means.

12. An apparatus according to claim 11, wherein said stapler means performs the stapling to the sheets stacked on a tray.

13. An apparatus according to claim 11, further having:

stacking means for stacking originals;

feeding means for sequentially feeding the originals stacked on said stacking means from a last page to an exposing position in said first mode and for sequentially feeding the originals from a front page to said exposing position in said second mode; and exposing means for exposing the original fed to said exposing position, and wherein said image forming means forms the image of the original exposed by said exposing means onto the sheet.

14. An apparatus according to claim 13, wherein the originals are stacked on a tray in a face-up state, and said feeding means feeds the original at the bottom position on said stacking means in said first mode and feeds the original at the top position on said stacking means in said second mode.

15. An apparatus according to claim 11, further comprising receiving means for facsimile receiving, and wherein in said second mode, said image forming means forms the image received by said receiving means.

16. An apparatus according to claim 11, further having storage means for storing the images, and wherein in said second mode, said image forming means forms the images stored in said storage means.

17. An apparatus according to claim 11, further having input means for inputting an image from a computer, and wherein in said second mode, said image forming means forms the image inputted by said input means.

18. An apparatus according to claim 11, wherein said image forming means ejects the sheets in a face-up state.

19. An apparatus according to claim 11, wherein said first position is a position on a left side with respect to the ejecting direction of the sheet, and said second position is a position on a right side with respect to the ejecting direction of the sheet.

20. An apparatus according to claim 11, wherein said rotating means rotates the image by 180° upon said second mode.

21. An image forming apparatus comprising:

image forming means for forming an image onto a sheet;

ejection means for ejecting the sheet onto which the image is formed in either one of a face up state and a face down state;

binding means for binding the sheets ejected by said ejection means; and rotating means for rotating the image so that an orientation of the image which is formed by said image forming means onto the sheet ejected in the face up state is different by 180° from that of the image onto the sheet ejected in the face down state.

22. An apparatus according to claim 21, wherein said rotating means does not perform rotation processing of the image when the sheet is ejected by said ejection means in said face up state, and said rotating means performs 180° rotation processing of the image when the sheet is ejected by said ejection means in the face down state.

* * * * *

UNITED STATES PATENT AND TRADEMARK OFFICE
CERTIFICATE OF CORRECTION

PATENT NO. : 5,722,031
DATED : February 24, 1998
INVENTOR(S) : Fujii et al.

It is certified that error appears in the above-indentified patent and that said Letters Patent is hereby corrected as shown below:

COLUMN 3:

Line 36, "led" should read --fed--.

COLUMN 4:

Line 11, "electing" should read --ejecting--.
Line 25, "once" should read --first--.

COLUMN 11:

Line 31, "mode" should read --modes--.

COLUMN 13:

Line 4, "to" should be deleted.

Signed and Sealed this

Thirteenth Day of October 1998

Attest:

BRUCE LEHMAN

Attesting Officer

Commissioner of Patents and Trademarks